(12) United States Patent
Memon et al.

(10) Patent No.: US 8,166,544 B2
(45) Date of Patent: Apr. 24, 2012

(54) NETWORK-BASED INFECTION DETECTION USING HOST SLOWDOWN

(75) Inventors: Nasir Memon, Holmdel, NJ (US); Husrev Taha Sencar, Lyndhurst, NJ (US); Kulesh Shanmugasundaram, Brooklyn, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 1047 days.

(21) Appl. No.: 12/037,212

(22) Filed: Feb. 26, 2008

(65) Prior Publication Data
US 2009/0126019 A1 May 14, 2009

Related U.S. Application Data

(60) Provisional application No. 60/986,927, filed on Nov. 9, 2007.

(51) Int. Cl.
| | |
|---|---|
| G06F 15/173 | (2006.01) |
| G06F 1/00 | (2006.01) |
| G06F 1/04 | (2006.01) |
| G06F 1/14 | (2006.01) |
| G06F 11/00 | (2006.01) |
| G06F 12/14 | (2006.01) |
| G08B 23/00 | (2006.01) |

(52) U.S. Cl. .......... 726/23; 709/224; 713/500; 713/502; 726/22; 726/24; 726/25

(58) Field of Classification Search ................... 709/224; 713/500, 502; 726/22–25
See application file for complete search history.

(56) References Cited

U.S. PATENT DOCUMENTS

| | | | | |
|---|---|---|---|---|
| 6,970,924 | B1 * | 11/2005 | Chu et al. | 709/224 |
| 2004/0111607 | A1 * | 6/2004 | Yellepeddy | 713/155 |
| 2004/0123137 | A1 * | 6/2004 | Yodaiken | 713/200 |
| 2004/0236757 | A1 * | 11/2004 | Caccavale et al. | 707/100 |
| 2006/0090209 | A1 * | 4/2006 | Garay et al. | 726/26 |
| 2007/0041364 | A1 * | 2/2007 | Kakadia | 370/352 |

OTHER PUBLICATIONS

Ahn, Sangtae & Fessler, Jeffrey. "Standard Errors of Mean, Variance, and Standard Deviation Estimators". EECS Department, The University of Michigan. <www.eecs.umich.edu/~fessler/papers/files/tr/stderr.pdf>. Published: Jul. 24, 2003.*
DiabloHorn; KD-Team. "Timing Rootkits". <http://kd-team.com/papers/Timing_Rootkits.pdf> Published: Dec. 30, 2005. <http://www.infosecwriters.com/texts.php?op=display&id=377>.*

* cited by examiner

*Primary Examiner* — Jeffrey D Popham
*Assistant Examiner* — Kevin Bechtel
(74) *Attorney, Agent, or Firm* — John C. Pokotylo; Straub & Pokotylo

(57) ABSTRACT

Host malware (or change) may be detected by (1) receiving baseline set of response time information for each of one or more transactions involving (A) the host and (B) at least one peer of the host, (2) determining or receiving a later set of response time information for each of the one or more transactions involving the host and the at least one peer of the host, and (3) determining whether or not host slowdown has occurred using the baseline set of response time information and the later set of response time information. The execution of a host malware (or change) protection policy may be controlled using at least the determination of whether or not host slowdown has occurred.

20 Claims, 12 Drawing Sheets

| HOST ID | TRANSACTION ID | DELAY | TIME DATE STAMP |
|---|---|---|---|
| ... | ... | ... | ... |

NETWORK-BASED INFECTION DETECTION USING HOST SLOWDOWN

§0. PRIORITY CLAIM

This application claims the benefit of U.S. Provisional Patent Application Ser. No. 60/986,927 (incorporated herein by reference and referred to as "the '167 provisional"), titled "NON-HOST BASED INFECTION DETECTION VIA SYSTEM SLOWDOWN" filed on Nov. 9, 2007, and listing Nasir MEMON and Husrev T. SENCAR as the inventors. The present invention in not limited to requirements of the particular embodiments described in the '167 provisional.

§1. BACKGROUND OF THE INVENTION

§1.1 Field of the Invention

The present invention concerns detecting an infection in a host. In particular, the present invention concerns detecting malware infections in a host by passively observing and measuring host slowdown in responses to known network events.

§1.2 Background Information

Today, PCs and computer networks are vulnerable to attacks from a variety of globally-distributed sources, who range in size and scope from large-scale international criminal organizations to individual hackers, and whose tactics continually evolve. The increasing prevalence of rootkit type attacks confirms fears that attackers are using sophisticated techniques to hide malicious programs. The focus of malware infections has typically been to hide so-called trojans, spyware, or mass circulation viruses and worms, and infect as many systems as possible. This emerging breed of sophisticated malware seeks to ensure that it goes unnoticed on the host system, and infect or re-infect other areas of the host system when needed.

These types of infections can later be used to install any malicious code to perform functions using the benefit of total concealment. For example, infected systems are often used as a SPAM platform.

Rootkits may find their way onto end user devices through known security holes in an operating system, by being downloaded with other programs, or any other common infection technique. Rootkits infect a host system by either replacing or attaching themselves to system components, thereby making their detection by the operating system extremely difficult.

Given the capability of rootkits to mask their activity, conventional scanning engines based on known bad file signatures are often completely ineffective. In other words, often, a malware infection will be totally stealth and can remain for great lengths of time without being detected.

Unfortunately, to date, there are no established mechanisms that can reliably detect the presence of such malware once a computer is infected with them. Therefore, it would be extremely useful to detect if and when a host computer is compromised (i.e., when the host computer is infected with malware).

§1.2.1 Previous Approaches and Perceived Limitations of Such Approaches

Although there are a variety measures to prevent infection with such malware, once infected, detecting the presence of rootkits and the products they are hiding is not trivial. Essentially, a definitive solution to rootkit (based malware) detection requires an uninfected copy of the system to be available as a reference. In this setting, to circumvent the cloaking effect of the rootkit, the uninfected system has to perform a file-by-file comparison with the test system to discover the rootkit and its payload.

Aside from practical difficulties in maintaining a reference copy, systems are not typically static—legitimate changes take place quite frequently within a system. These changes make simple reference copy file comparison approach inapplicable in many, if not most, cases. Therefore, in practice, detectors have to work within the potentially infected host system to detect malicious programs and their traces in a blind manner, while avoiding placing too much trust on observations provided by the potentially infected host system itself.

Today, most existing virus detectors operate by targeting specific rootkits. These detectors, in general, will search for hidden files, folders and processes, compare users mode information to kernel mode (e.g., differences between the system registry and file system), and try to identify active kernel hooks established by unknown programs (either automatically or though advanced analysis tools which allows users to examine a host system's operations in detail). However, one deficiency of this class of detectors is that malicious software developers are aware of these techniques and are constantly developing their malware products to evade such detection methods.

§2. SUMMARY OF THE INVENTION

Embodiments consistent with the present invention may be used to facilitate host malware (or host change) detection. Such embodiments may do so by, (a) receiving baseline set of response time information for each of one or more transactions involving (A) the host and (B) at least one peer of the host, (b) determining or receiving a later set of response time information for each of the one or more transactions involving the host, (c) determining whether or not host slowdown has occurred using the baseline set of response time information and the later set of response time information, and (d) controlling the execution of a host malware protection policy using at least the determination of whether or not host slowdown has occurred. At least one embodiment consistent with the claimed invention may determine, by an edge router using a SPAN port, a later set of response time information for each of one or more types of transactions. At least another embodiment consistent with the claimed invention may determine, at a local area network hub, a later set of response time information for each of one or more types of transactions. At least another embodiment consistent with the claimed invention may determine, at a network switch, a later set of response time information for each of one or more types of transactions.

§3. BRIEF DESCRIPTION OF THE DRAWINGS

FIG. 4 is an exemplary data structure illustrating the tracked and saved information, which may have been acquired during host transaction delay measurement by a diagnosing agent, consistent with the present invention.

§4. DETAILED DESCRIPTION

Figure 1:
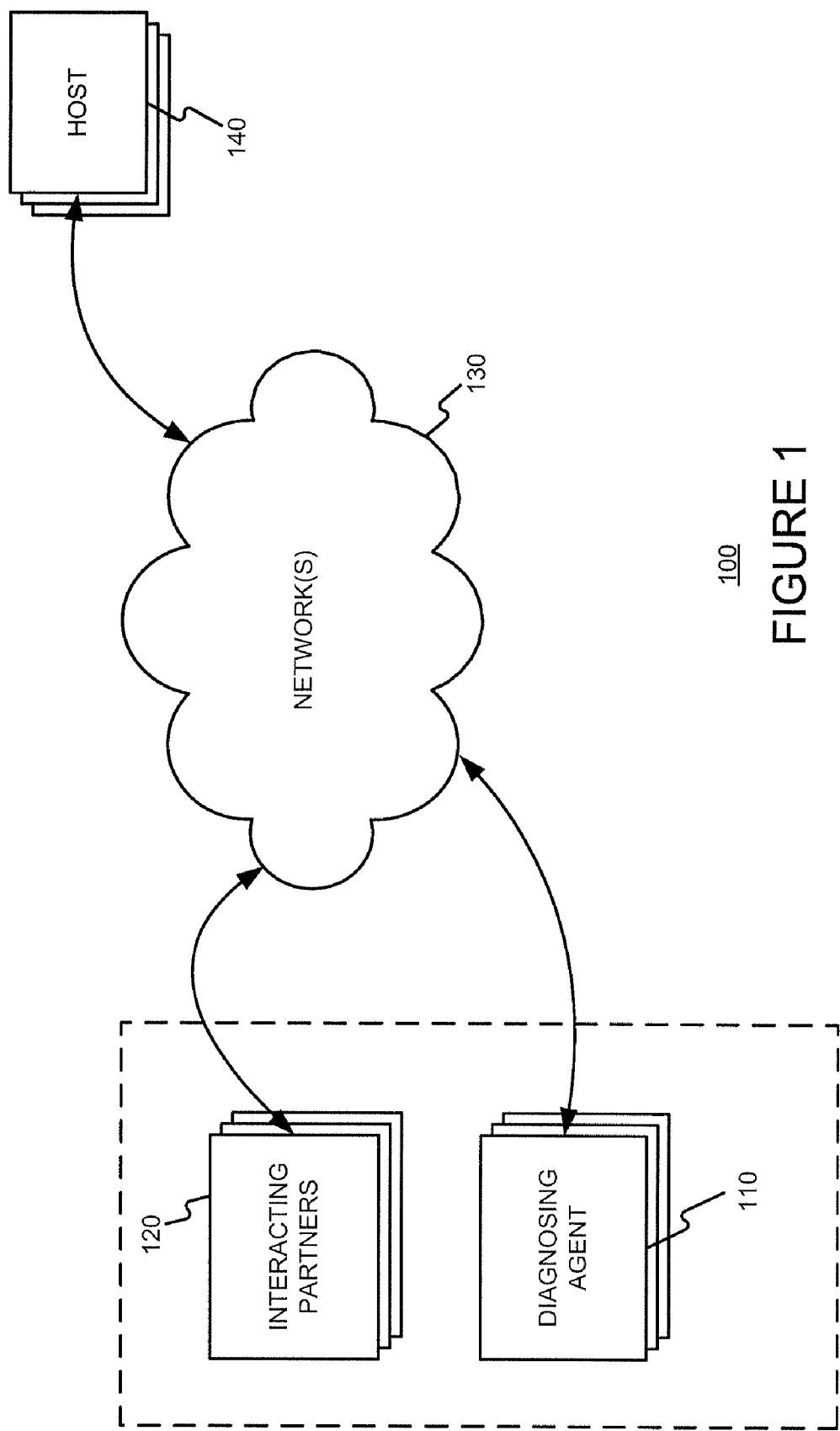
FIG. 1 is an exemplary environment illustrating components of an exemplary system consistent with the present invention

The present invention may involve novel methods, apparatus, message formats, and/or data structures to facilitate the detection of malware infections in a host system. The present invention may do so by passively observing and measuring slowdown in the host system's responses to known network events. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§4.1 General Environment and Method for Slowdown-Based Host System Malware Infection Detection Network-based techniques to identify host systems (e.g., computers) that are potentially infected with (e.g., persistent) malware are described. Such techniques should even allow the detection of malware which cannot be reliably detected using conventional host-based detection techniques. Embodiments consistent with the present invention may observe the behavior of a host system at a network level. Such embodiments may be viewed as an initial step in malware infection detection, which may be followed by more targeted host-based detection techniques to determine the type and extent of infection.

Embodiments consistent with the present invention may exploit the fact that a malware infection often is (or causes) an additional process that runs on the operating system, and which consequently consumes some of the system resources through introduction of additional CPU-bound and/or I/O-bound operations. That is, embodiments consistent with the present invention may exploit the fact that, in essence, an infection often contributes to the overall processing load of a computer, thereby effectively delaying other system operations, and ultimately causing a slowdown effect.

The execution of any system function hooked by a rootkit, will cause consumption of non-negligible amount of CPU cycles (See, e.g., Diablo Horn, "Timing Rootkits," The KD-Team (2005), incorporated herein by reference.). Such an activity can be detected through time and performance monitoring by taking a snapshot of the host system (or similar systems, referred to as "peer systems" without the connotation of "peer" in the communications network sense) when it is clean and comparing measurements from later versions of the host system to the initial measurements. In fact, most modern processors, such as those from Intel and AMD for example, support instructions to count events such as number of instructions decoded, number of interrupts received, number of cache loads and number of clock cycles a function needs to execute. Unfortunately, these infected functions can also be corrupted by malware to manipulate these measurements by properly offsetting them to match those of non-infected functions. Hence, at least some embodiments consistent with the present invention measure these and other similar indicators using mechanisms external to the host system, that observe the system while certain processes are executed by the system.

One of the most common ways a rootkit attains an undetectable presence by the kernel is by attaching itself to the part of the kernel that handles file I/O. If the rootkit can screen all file operations going on in the system, it can ensure that the rootkit's own components will never be noticed. At least some embodiments consistent with the present invention may exploit the fact that controlling and manipulating system performance-monitoring may require sophisticated design, which causes a larger number of consumed CPU cycles by the rootkit. In essence, one or more (or all) of these factors contribute to slowdown experienced by other processes. In modern processors, performance is usually bounded by the cost of I/O operations, which involve networking activity and waiting in buffers and queues. This is especially true for processes that use the Internet and network transactions. Therefore, the present inventors believe that network protocols present themselves as valuable resources for measurement of system performance, and the time response characteristics of such interactions can be used to estimate changes in a host system.

In at least some embodiments consistent with the present invention, to determine the slowdown experienced by an infected host system (e.g., a computer), an evaluation is performed on response time characteristics of user space applications, kernel space applications, or both, that involve network and web access and that require a sequence of events before executing an action. Application of embodiments consistent with the present invention to the monitoring of different types of host systems for different types of malware may involve two primary design parameters. First, a set of indicators that will reflect the extent of slowdown due to infection should be designated. Next, the dependency of these indicators to varying system configurations and operation conditions like hardware specifications, operating system details, user interactions, and CPU-load and I/O related characteristics of various malicious programs, should be analyzed. Thus, such embodiments may involve analyzing the change in response-time characteristics in response to network events that happen in a sequence.

FIG. 1 is an exemplary environment illustrating components of an exemplary system consistent with the present invention. Specifically, the components may include a number of diagnosing agents 110, interacting partners 120, and hosts 140 communicating through one or more network(s) 130. A host 140 is a potentially infected system connected to a network 130. An interacting partner 120 is another host or service reachable by host's 140 network connection 130. It interacts with the host 140 within a set of agreed protocols wherein the interaction can be invoked by either of the two parties. A diagnosing agent 110 observes the communication between the host 140 and interacting partner 120 and is aware of the details of the protocols used for communication between the two parties. A diagnosing agent 110 may assume the role of interacting-partner 120, may function as a gateway proxy to the host 140, and/or may be any other intermediary that relays the communication between the two parties. Moreover, a diagnosing agent 110 may monitor various network protocol events and transactions that may occur between a host 140 and an interacting partner 120, thereby allowing the diagnosing agent 120 to detect a slowdown on a host 140.

Figure 2:
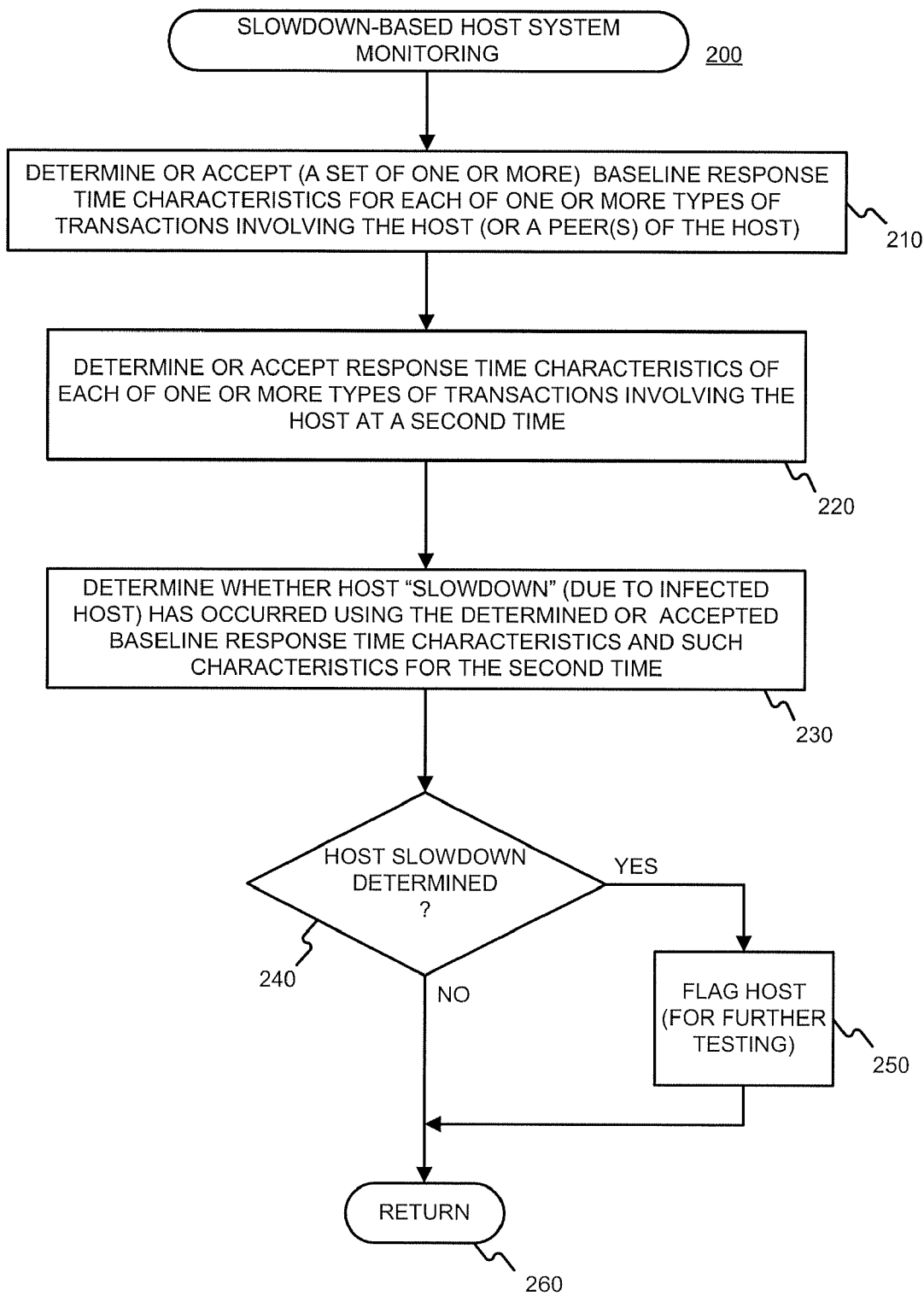
FIG. 2 is a flow diagram of an exemplary method that may be used to monitor a host system slowdown, for purposes of facilitating malware detection, in a manner consistent with the present invention.

FIG. 2 is a flow diagram of an exemplary method 200 that may be used to monitor a host system slowdown, for purposes of facilitating malware detection, in a manner consistent with the present invention. Specifically, the method 200 may determine or accept (e.g., a set of one or more) baseline response time characteristics for each of one or more types of transactions (when the host is known or believed to be uninfected). (Block 210) At a second (after the baseline measurements) time, the method 200 may determine or accept (e.g., a set of one or more) response time characteristics of each of one or more types of transactions on host. (Block 220) Subsequently, the method 200 may determine whether host "slowdown" (e.g., due to a host malware infection) has occurred using the determined or accepted baseline response time characteristics and such characteristics acquired at the second time. (Block 230) If a host slowdown is determined, then the method 200 may flag the host (for further testing) thus warning of a possible malware (e.g., a virus) on the host system. (Blocks 240 and 250) If a host slowdown has not been determined or a host has been flagged for further testing, the method 200 may simply return. (Blocks 240, 250, and 260) The acts performed by steps 220 to 260 may be repeated at different times so that the host's response time characteristic can be rechecked against the baseline.

Referring back to blocks 210 and 220, in at least some embodiments consistent with the present invention, the transactions may be for "user space" and/or "kernel space" applications that involve the network (e.g., web access). The time delay elapsed between the arrival of a protocol event to host and host's response to that event may be measured. Later, these measured sequence of data points, obtained over a long amount of time, may be combined and analyzed to detect changes in the behavior of the host's response time.

Protocol transactions that involve (A) query/response procedures, (B) challenge/response procedures, and/or (C) handshaking/negotiation mechanisms may be assumed to be utilized in quantification of the variation in time-delay characteristics of the host system. The following are a few examples where the delay it takes for the application to respond to an awaited response can be measured on the network by a diagnostic agent quite accurately, without interfering with the communication and protocol between the host in question and interacting-partner.

1. Web access involves querying the DNS server and a connection can be established only after the DNS server responds with the IP address. (query/response)
2. Establishing a TCP connection requires the client to acknowledge the SYN request (SYN-ACK packet) from the server before further communication (subsequent ACK packets) can take place. (query/response)
3. POP3 requests have to be processed in lockstep by both client and server; the client sends a request, waits for the response to that request, and only then can it prepare and ship the next fetch request. (query/response)
4. Challenge-response and challenge-handshake based authentication mechanisms where the parties have to perform local computations before responding to a challenge.
5. Digital signature verification protocols where the host responds only after identity of the interacting-partner is verified through local computation.

These examples are described later with reference to FIGS. 7-11.

Referring back to block 230 of FIG. 2, initial studies have shown that the time-delay measurements involving interactions that use user space better indicate the presence of an infection than those that use kernel level interactions. For example, in the above interactions 1 and 3-5 (which require some degree of user space program involvement), malware infections can cause delay measurements to increase by a small fraction or up to an order of magnitude depending on the specifics of the malware program. Measurements indicate that an average increase of 2-3% in CPU load by a user space program can result in measurable delays in host's responses. On the other hand, in interaction 2 (and the like), the range of time delay increases are typically more limited.

Referring back to block 250, other actions (e.g., in accordance with a host malware protection policy) may be performed. For example, such policies might include one or more of notifying a user of host (via the host or via some other device), notifying an administrator responsible for the host, notifying peers of the host, quarantining the host, performing special processing on any data (e.g., executables) received from the host), etc.

§4.2 System Slowdown Measurement

§4.2.1 General Methods and Data Structures

Observing the host continuously over a long period of time, a diagnosing agent consistent with the present invention may generate a multi-dimensional delay vector in which each dimension consists of delay measurement data for the proposed slowdown indicators. For a given slowdown indicator, measurement procedures may include of two stages. During the first stage (also referred to as the "baseline") the host is considered to be in a non-infected (also referred to as "clean") state. Measurements taken in the second stage are to be used for determining whether or not the host has moved into an infected state. (Even in cases where the host was already infected during the first stage, the second stage will be useful in detecting an increase in malware infections.) For simplicity, from now on, the initial state of the host may be referred to as the clean state and the latter state may be referred as the infected state.

Figure 3:
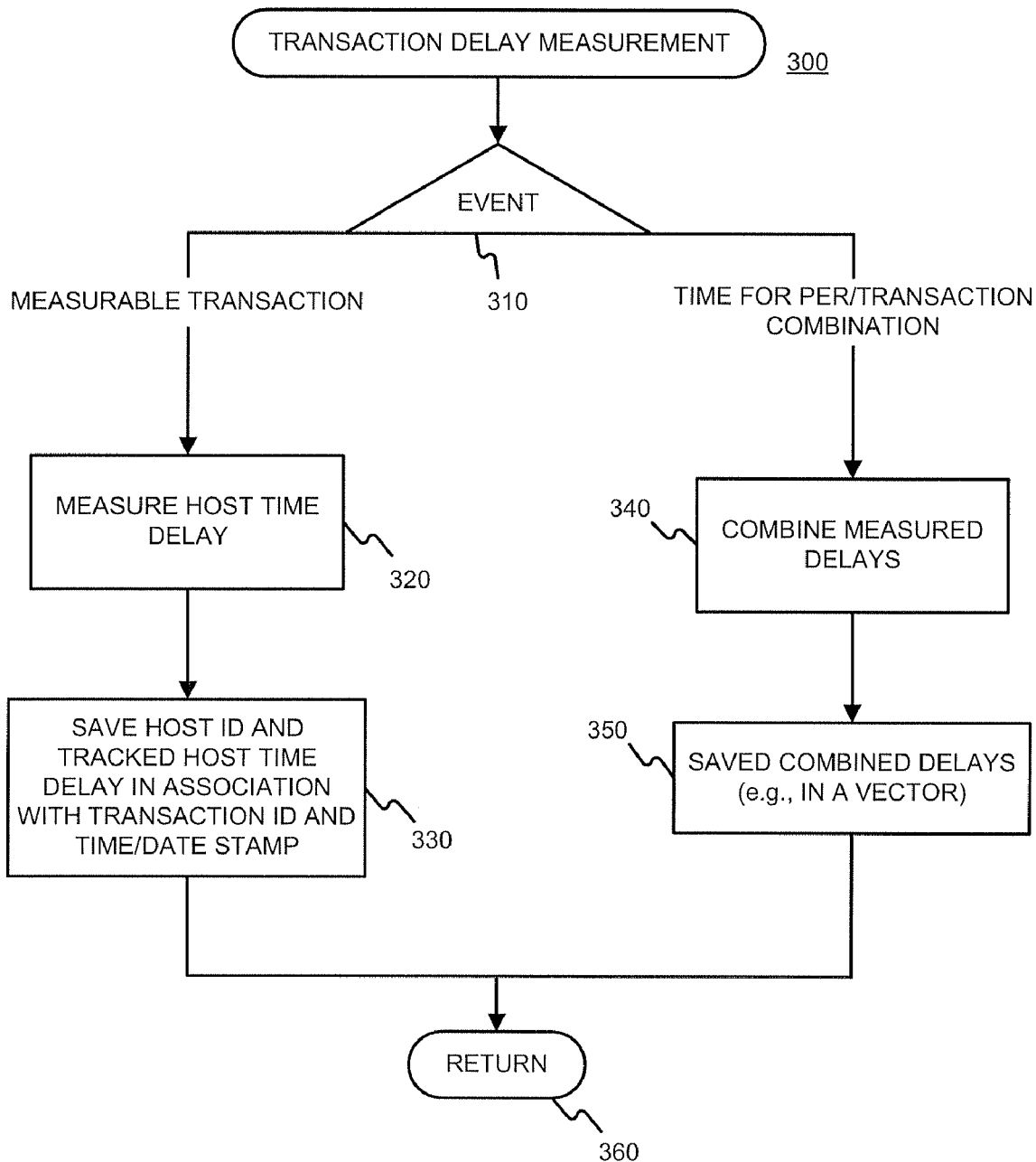
FIG. 3 is a flow diagram of an exemplary method that may be used to track time delays of one or more transactions involving a host system, in a manner consistent with the present invention.

FIG. 3 is a flow diagram of an exemplary method 300 that may be used to track time delays of one or more transactions involving a host system, in a manner consistent with the present invention. The method 300 may follow different actions depending on different events that may occur. (Block 310) One event is the occurrence of a measurable transaction. Under such an event, the method 300 may track the host time delay by measuring the delay and subsequently saving the measured host time delay (e.g., in association with a host identification, a transaction id/type, and/or a time/date stamp) before the system returns. (Blocks 320, 330 and 360) Another event that may occur, following a measurable transaction event, is a time for per/transaction combination. Under such an event, the method 300 may combine the previously measured and saved host time delays. (Block 340) Subsequently, the method 300 may save the combined host time delays (e.g., in a vector) before it returns. (Blocks 350 and 360)

The method 300 may be applied in both the first stage and the second stage in order to record a host's response time delays in both stages thus, allowing a comparison of measured time delays in both stages. Based on the comparison of time delays in the two stages, it is feasible to determine a possible malware infection (or additional new malware infections) of a host.

Figure 4:
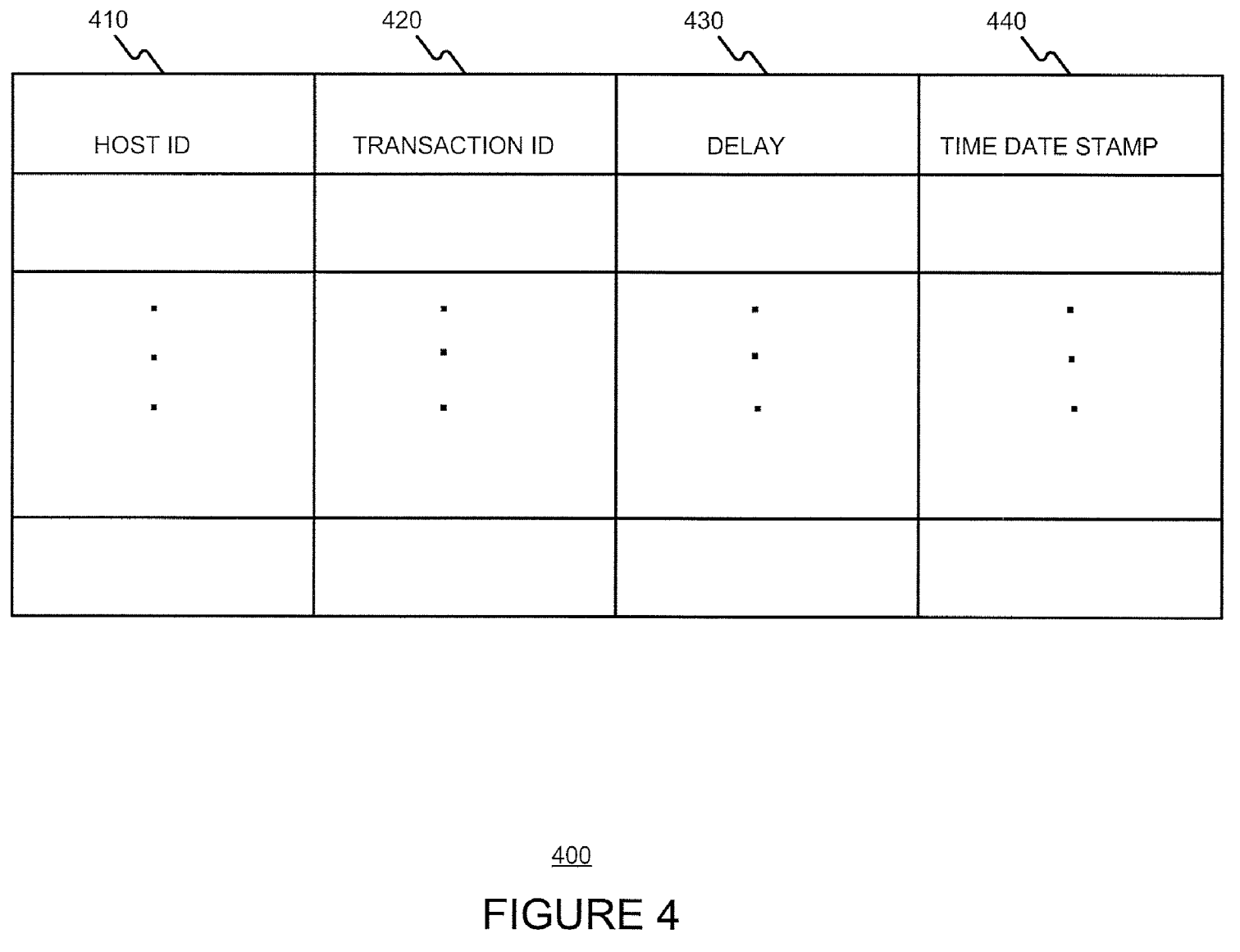

FIG. 4 is an exemplary data structure 400 illustrating the saved information, which may have been acquired during host transaction delay measurement by a diagnosing agent, consistent with the present invention. In particular, as illustrated by the columns of the data structure 400, the diagnosing agent may measure and save information such as, for example, host ID 410, transaction ID 420, time delay 430, and time/date stamp 440. Column 410 may simply include a number of identifications of hosts being monitored within a network. Column 420 may include transaction IDs which may constitute different network protocol events/transactions that occur at the corresponding monitored host IDs 410. (Measurements for common transactions may be aggregated, as described later.) Column 430 may simply include the time delay measurements of the transaction 420 that occur at the corresponding monitored host IDs 410. Finally, column 440 may simply include a time and date stamp of the measurement.

Figure 5:
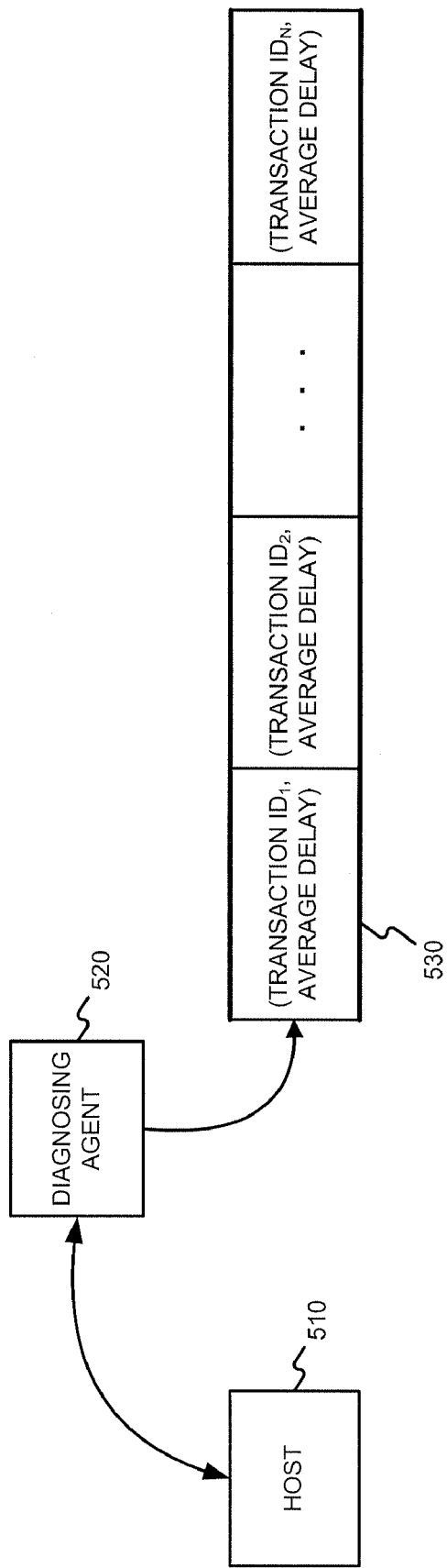
FIG. 5 illustrates an exemplary multi-dimensional delay vector of a monitored host, determined by a diagnosing agent, consistent with the present invention.

Using such information 400, the diagnosing agent may generate a multi-dimensional delay vector for the host, where each dimension consists of delay measurement data for the proposed slowdown indicators. That is, each dimension may correspond to aggregated delay measurements for a given type of transaction (identified by a common transaction id 420). FIG. 5 illustrates a diagnosing agent 520 that has produced a multi-dimensional delay vector 530 of a monitored host 510 in a manner consistent with the present invention. In particular, the diagnosing agent 520 may have monitor network protocol events/transactions (slowdown indicators) occurring at the host 510 when it interacted with an interacting partner (not shown). Referring back to 340 and 350 of FIG. 3, the diagnosing agent 520 may produce a combined delay vector 530 for the host 510.

Each dimension of the combined delay vector 530 may include such information as a transaction delay ID and an average delay measurement, and may be stored in association with an identifier (not shown) of the host 510. This combined delay vector 530 may be subsequently used by the diagnosing agent 520 to determine if a malware infection has occurred in the host 510 or if any new additional malware infections are present within the host 510.

§4.2.2 Exemplary Types of Slowdown

Figure 6:
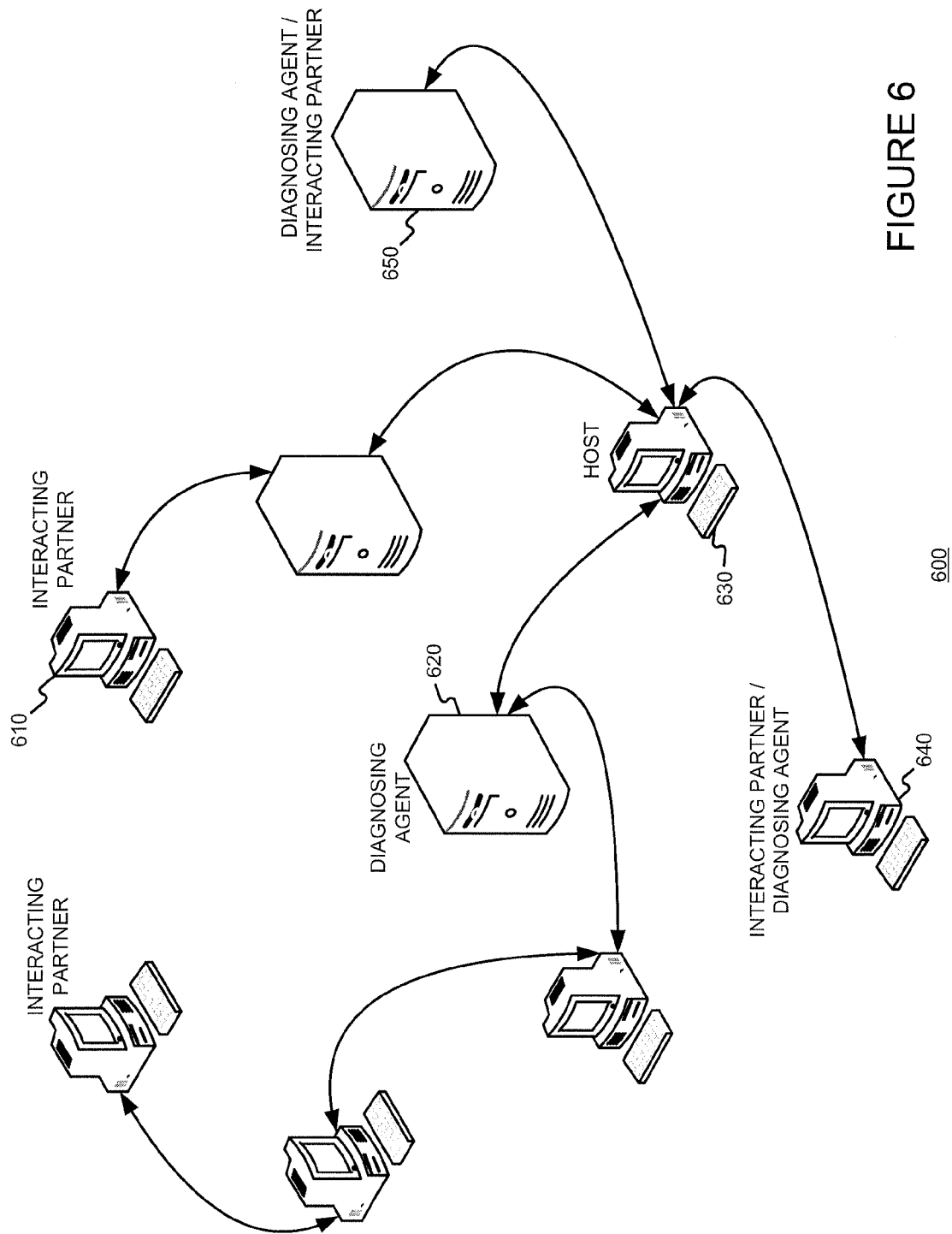
FIG. 6 is an exemplary environment illustrating possible configurations for a host, an interacting partner, and a diagnosing agent, consistent with the present invention.

FIG. 6 is an exemplary environment 600 illustrating some possible configurations for the host (630), an interacting partner (610), and a diagnosing agent (620) in a manner consistent with the present invention. A diagnosing agent monitors a host's response to a number of network protocols/transactions taking place between the host and an interacting partner. These network protocols/transactions, taking place between a host and an interacting partner, serve as slowdown indicators. By continuously evaluating these slowdown indicators, a diagnosing agent may detect host slowdown which might lead to detection of a possible malware infection of the host system. As show, a given component 640 may act as both an interacting partner and a diagnostic agent.

The following describes exemplary types of network transactions between a host and a diagnosing agent that may serve as slowdown indicators in embodiments consistent with the present invention. Specifically, FIGS. 7-10 illustrate state diagrams of various network protocols/transactions indicating time-delays that may be measured and used to detect host slowdown in a manner consistent with the present invention.

Figure 7:
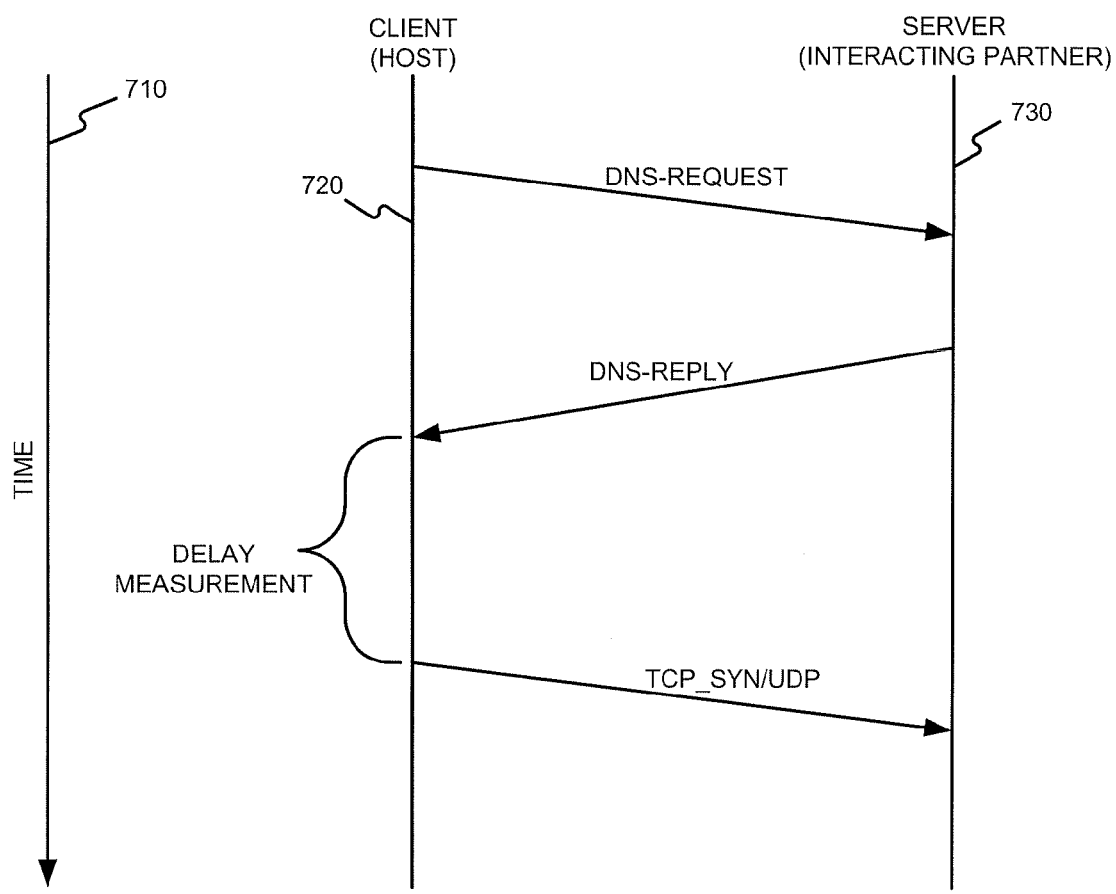
FIGS. 7-11 illustrate state diagrams of various network protocols/transactions, as well time-delays which may be measured to facilitate the detection of host slowdown, in a manner consistent with the present invention.

FIG. 7 illustrates a state diagram in a Domain Name System ("DNS") protocol. The transactions proceeding between the client 720 (host) and the server 730 (interacting partner) along with the time-delay measurement is also depicted. This measured time-delay may be continuously monitored by a diagnosing agent to detect any possible host slowdown resulting from a potential malware infection of the host system.

Figure 8:
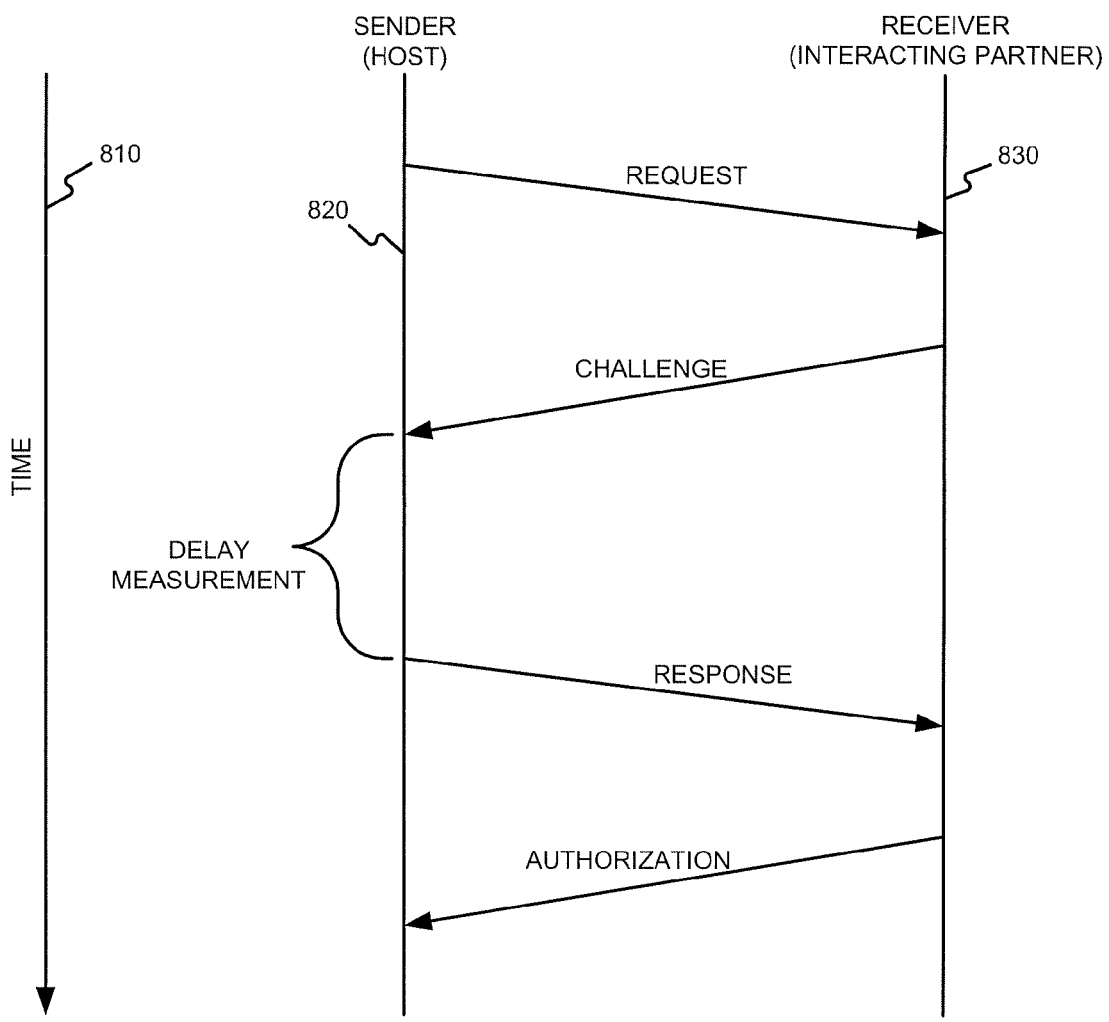

FIG. 8 illustrates a state diagram in a generic challenge-response protocol. The transactions proceeding between the sender 820 (host) and the receiver 830 (interacting partner) along with the time-delay measurement is also depicted. This measured time-delay may be continuously monitored by a diagnosing agent to detect any possible host slowdown resulting from a potential malware infection of the host system.

Figure 9:
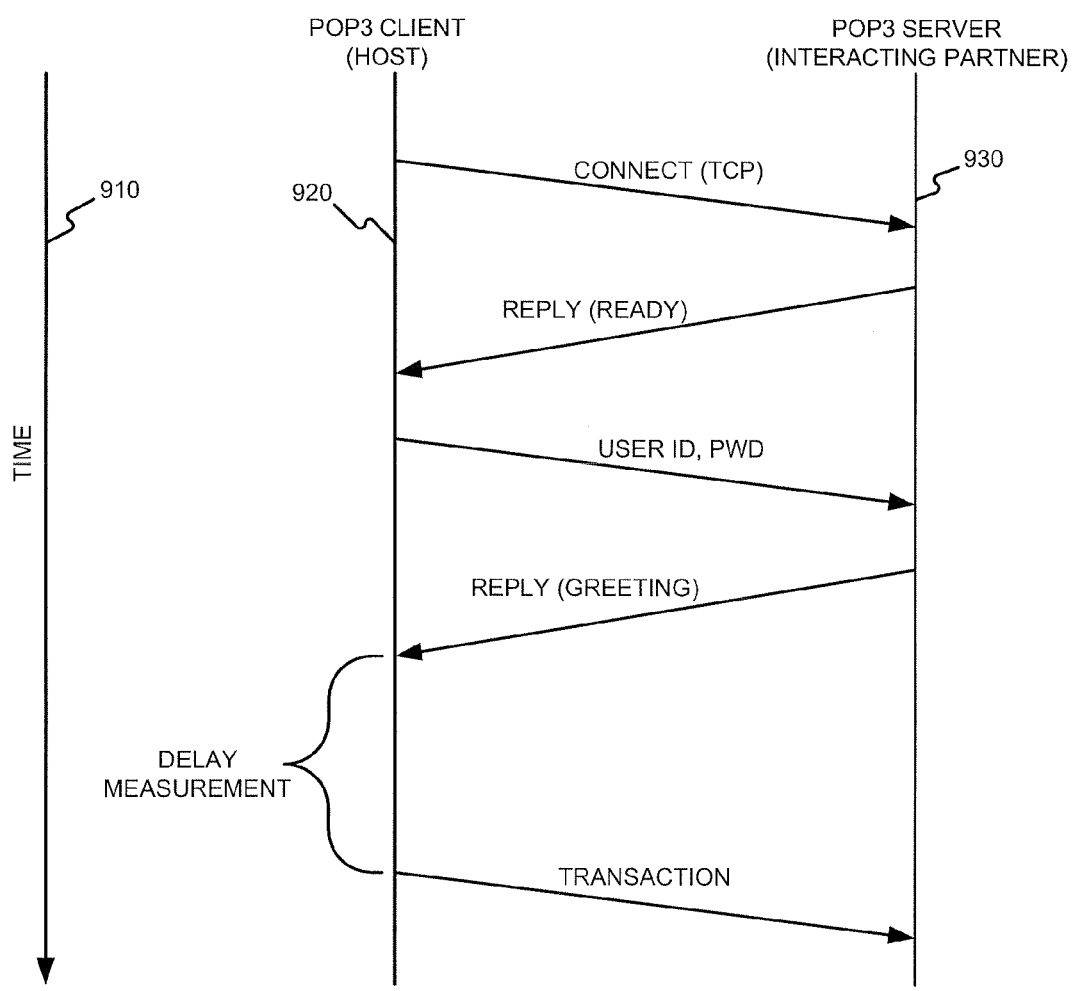

FIG. 9 illustrates a state diagram in a Post Office Protocol 3 ("POP3") protocol. The transactions proceeding between the POP3 client 920 (host) and the POP3 server 930 (interacting partner) along with the time-delay measurement is also depicted. This measured time-delay may be continuously monitored by a diagnosing agent to detect any possible host slowdown resulting from a potential malware infection of the host system.

Figure 10:
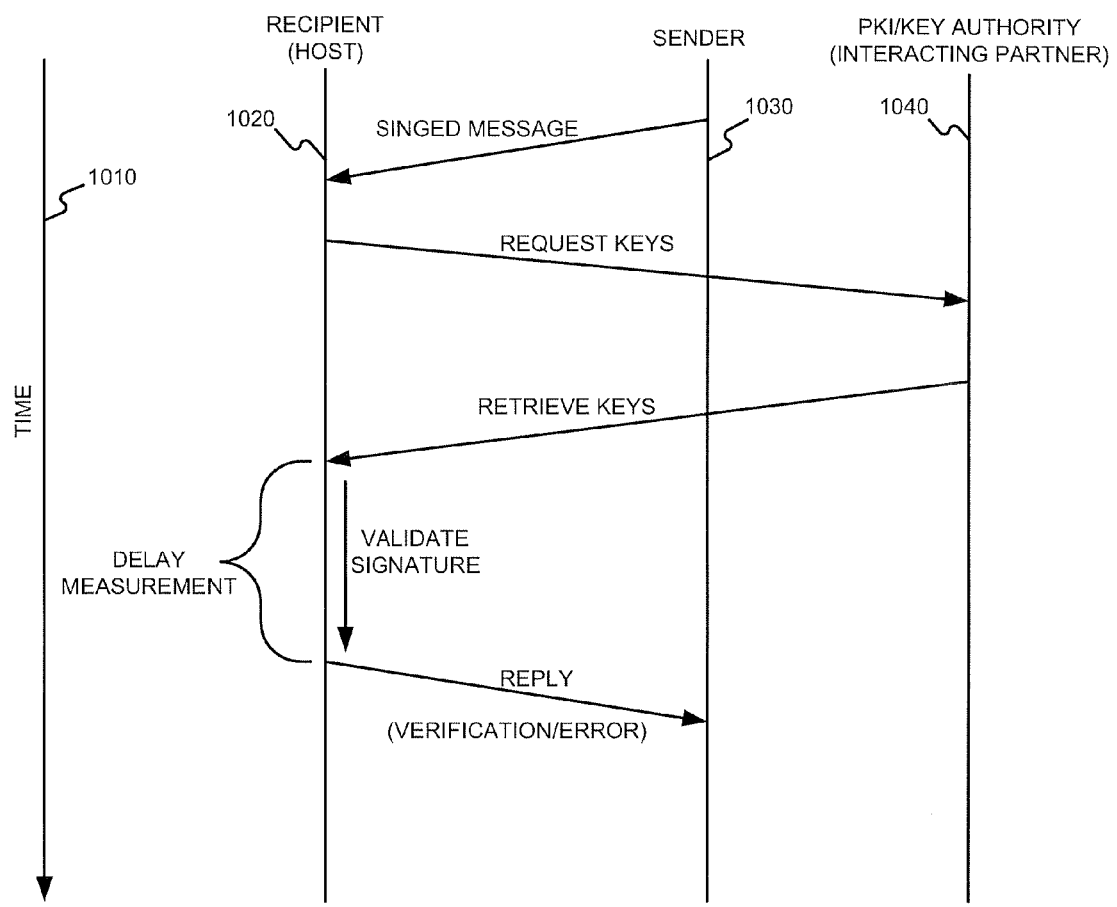

FIG. 10 illustrates a state diagram in a generic digital signature verification protocol. The transactions proceeding between the recipient 1020 (host) and the sender 1030 (interacting partner) along with the time-delay measurement is also depicted. This measured time-delay may be continuously monitored by a diagnosing agent to detect any possible host slowdown resulting from a potential malware infection of the host system.

Figure 11:
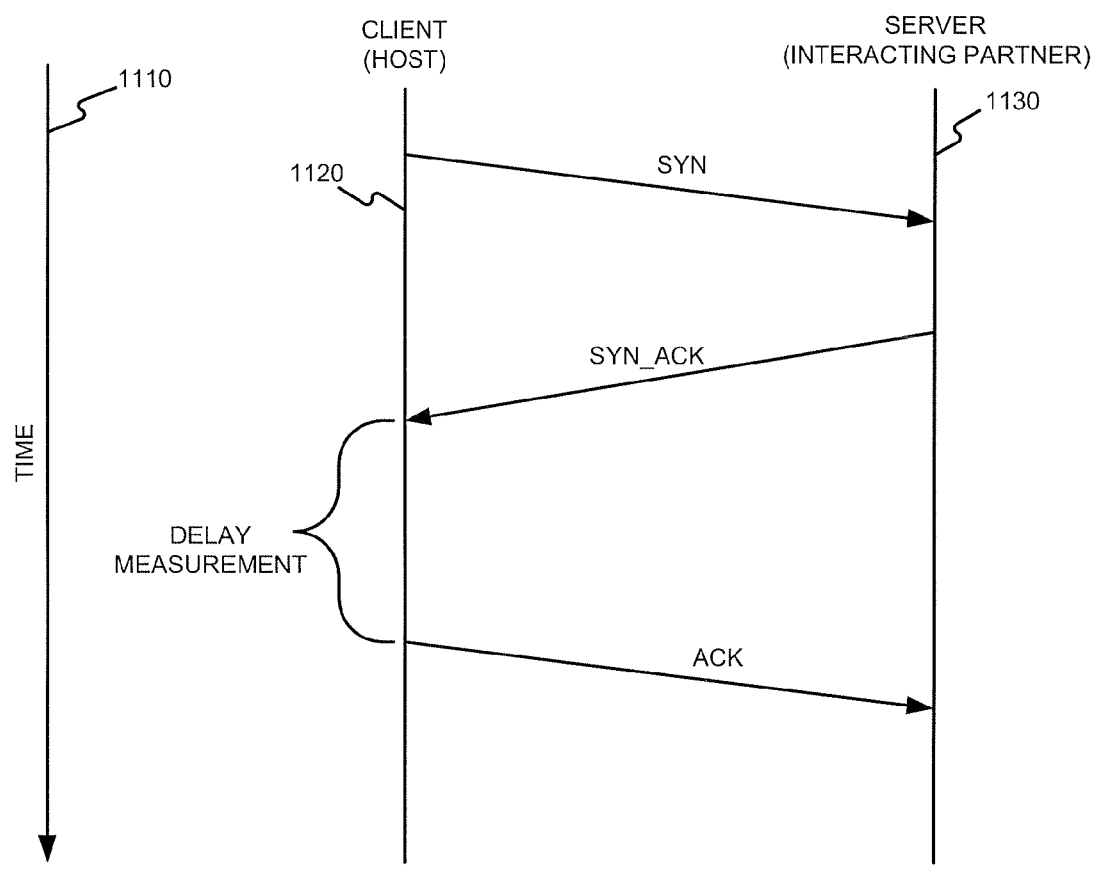

FIG. 11 illustrates a state diagram in a TCP protocol. The transactions proceeding between the client 1120 (host) and the server 1130 (interacting partner) along with the time-delay measurement is also depicted. This measured time-delay may be continuously monitored by a diagnosing agent to detect any possible host slowdown resulting from a potential malware infection of the host system.

§4.3 Exemplary Apparatus

Figure 12:
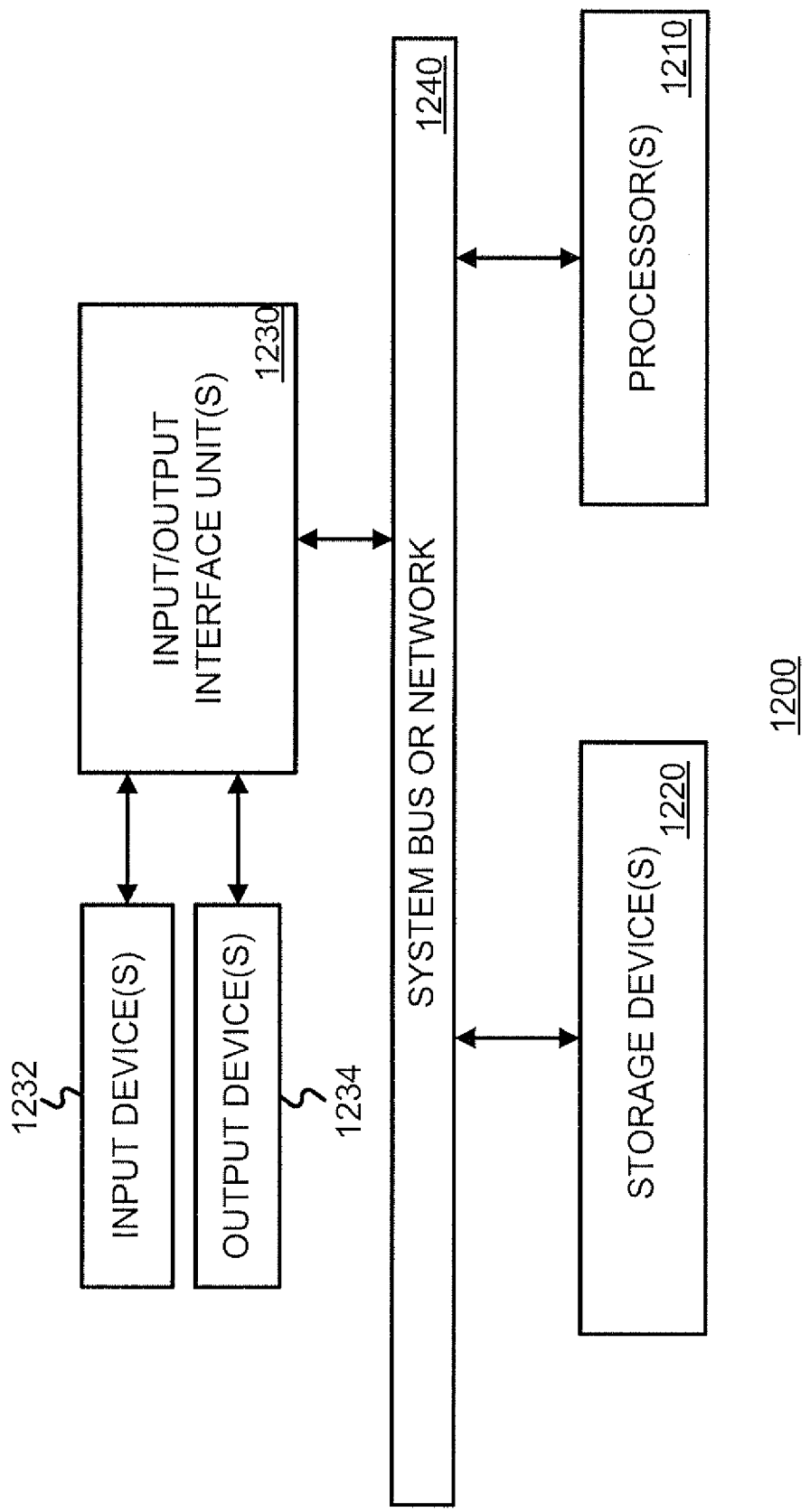
FIG. 12 is a block diagram of an exemplary apparatus that may perform various operations, and store various information generated and/or used by such operations, in a manner consistent with the present invention.

FIG. 12 is high-level block diagram of a machine 1200 that may perform one or more of the processes described above, and/or store information used and/or generated by such processes. The machine 1200 basically includes one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230. The one or more processors 1210 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1220 and/or may be received from an external source via one or more input interface units 1230. Thus, various acts and methods described above may be implemented as processor executed software modules, stored on a tangible medium.

In one embodiment, the machine 1200 may be one or more conventional personal computers, servers, or routers. In this case, the processing units 1210 may be one or more microprocessors. The bus 1240 may include a system bus. The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1232, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1210 through an appropriate interface 1230 coupled to the system bus 1240. The output devices 1234 may include a monitor or other type of display device, which may also be connected to the system bus 1240 via an appropriate interface. In addition to (or instead of) the monitor, the personal computer may include other (peripheral) output devices (not shown), such as speakers and printers for example.

Referring back to FIGS. 1 and 6, each of the host (140, 630), the interacting partner (120, 610) and the diagnosing agent (110, 620) may be implemented on one or more machines 1200.

§4.4 Refinements and Extensions

As mentioned earlier, for a given slowdown indicator, measurement procedures may occur over two stages. During the first stage (the baseline), the host may be considered to be in a non-infected state. The measurements taken in the second stage may then be used to determine or help determine whether or not the host has moved from a clean state, to an infected state (or from a first infected state to a more infected state).

In the first stage, measured delay data is used to establish a baseline for characterizing the behavior of a host under various operating conditions. Since delay measurements will also vary with the activity performed by the host, data obtained during busy and slow periods should be evaluated together. This may be achieved by first windowing the data, and then classifying the activity level during each measurement window (e.g., low activity, moderate activity, high activity, etc.), through computation of a mean value in each window. The actual number of partitions used may depend on the dynamic range of the variation in the delay values measured during the first stage. (For example, the measurements from a host which is primarily used for web browsing activity will yield only single activity level; whereas a host used for both web-browsing and technical computations will yield two activity levels.) In designating different activity levels, we ensure that the difference between adjacent levels is set to be large enough to ensure that an increase in delay measurements (due to an infection) cannot cause confusion in categorization of the measurement data to activity levels.

The second stage of measurements is used to detect or to help detect a slowdown in the host's response. Since, an infection can only prolong the delay in a host's responses, the non-decreasing nature of the delay measurements may be used in slowdown detection. Thus, a slowdown due to an infection should reveal itself in all measurements and at all activity levels.

To detect a slowdown, measured data may be continuously windowed and partitioned into sub-vectors for analysis. The analysis may proceed along two independent paths.

In a first path, the delay data in each sub-vector is treated as a delay stream and it is assessed within a binary sequential hypothesis testing framework (See, e.g., Michle Basseville and Igor V. Nikiforov, *Detection of Abrupt Changes—Theory and Application*, Prentice-Hall, Inc. (ISBN 0-13-126780-9—April 1993—Englewood Cliffs, N.J.), incorporated herein by reference.) to detect a change in statistics, where the null and alternative hypotheses are associated with the baseline (e.g., clean) and infected states, respectively. The empirical distribution of the measurements obtained during the clean state is used for statistical characterization of the host under clean state hypothesis. With each new measurement in the second stage this initial statistical characterization is updated and tested under alternative hypothesis to see if such a state change occurred. In making a decision, the detection statistic for each delay stream (i.e., each activity level) is set separately.

In the second analysis path, non-parametric statistical tests may be used to determine subtle changes in the delay stream characteristics. A detection algorithm may be based on a two-window paradigm, where the measurements in two reference windows are compared to those of the current window. One of the reference windows is comprised of measurements obtained in the first stage and it is static. The other reference window is continuously updated to determine every incremental change in a sliding manner. These tests include well known Wilcoxon test, Kolmogorov-Smirnov test and various variants (See, e.g., Daniel Kifer, Shai B. David, and Gehrke Johannes, "Detecting Change in Data Streams," *Proceedings of the Thirtieth Int'l Conf. on Very Large Data Bases*, Vol. 30, pp. 180-191 (2004), incorporated herein by reference.), Kullback-Leibler distance (See, e.g., Tamraparni Dasu, Shankar Krishnan, Suresh Venkatasubramanian, and Ke Yi "An Information-Theoretic Approach to Detecting Changes in Multi-Dimensional Data Streams," *Proc. of Interface* (May 24-27, 2006), incorporated herein by reference.) and other prominent non-parametric tests (See, e.g., David J. Sheskin, *Handbook of Parametric and Nonvarametric Statistical Procedures* (Chapman & Hall, 2004), incorporated herein by reference.). Thus, a two-dimensional vector of test results (for the two reference windows) is obtained.

When the test results from various delay streams agree in favor of alternate hypotheses and yield sufficient statistical separation, a detection decision indicating potential malware infection is made. This may be realized by combining all test results into a feature vector and making a final decision through use of machine learning techniques. Those hosts are later subjected to more thorough inspection by using host-based techniques for scanning/identification and cleaning of any infection.

Referring back to FIG. 1, a host 140 represents a potentially infected system connected to a network 130. According to the aforementioned scheme of the present invention a host 140 is regarded as a single component or node. However, in other embodiments consistent with the present invention, a host 140 may actually represent multiple components or nodes, as opposed to a single component or node.

Although exemplary embodiments described above concerned malware detection, alternative embodiments consistent with the present invention may be used to detect hardware modifications, hardware defects, firmware and software updates, firmware and software problems (e.g., faults and mis-configurations), etc. For example failures in hard disks, network interface cards or other I/O devices are likely to cause long delays in executing various network protocols. Similarly, any addition, replacement or modification in the hardware configuration can be potentially discovered based on changes in measured delay characteristics. Indeed, these types of events are likely to have a more pronounced effect on the delay, making such events easier to detect.

§4.5 Conclusions

As can be appreciated from the foregoing, embodiments consistent with the present invention may advantageously detect or help detect malware infection of a host. Such embodiments may avoid problems with host-based malware detection.

What is claimed is:

1. A computer-implemented method for facilitating host malware detection, the method comprising:
   a) determining, by a communications network device that passively monitors one or more network links between (A) a host and (B) at least one peer of the host, a baseline set of response time information for each of one or more types of transactions, wherein the response time information indicates a time including a delay between the host receiving a particular type of message from the at least one peer of the host and the host responding to the particular type of message, and wherein the communications network device is (A) a separate and distinct network entity from the host and the at least one peer of the host, and (B) included in or attached to one of a network switch, a network router, or a network hub;
   b) determining, by the communications network device, a later set of response time information for each of the one or more types of transactions indicating a time including a delay between the host receiving a particular type of message from at least one peer of the host and the host responding to the particular type of message;
   c) determining, by the communications network device, whether or not host slowdown has occurred by comparing the baseline set of response time information for at least one of the one or more types of transactions and the later set of response time information for the at least one of the one or more types of transactions; and
   d) controlling the execution of a host malware protection policy using at least the determination of whether or not host slowdown has occurred.

2. The computer-implemented method of claim 1 wherein the act of determining the baseline set of response time information includes
   1) for each of the one or more types of transactions involving the host, measuring at least one host response time delay,
   2) for each of the one or more types of transactions involving the host, saving each of the at least one host response time delay,
   3) for each of the one or more types of transactions involving the host, aggregating the saved at least one host response time delay,
   4) generating, for the host, a delay characteristic vector using the aggregated at least one host response time delay for the one or more types of transactions involving the host, and
   5) saving the delay characteristic vector.

3. The method of claim 1 wherein the act determining a later set of response time information for each of the one or more types of transactions involving the host is performed by an edge router using a SPAN port.

4. The method of claim 1 wherein the act of determining a later set of response time information for each of the one or more types of transactions involving the host is performed at a local area network hub.

5. The method of claim 1 wherein the act of determining a later set of response time information for each of the one or more types of transactions involving the host is performed at a network switch.

6. The method of claim 1 wherein at least one of the one or more types of transactions involving the host is a domain name system (DNS) transaction.

7. The method of claim 6 wherein each of the baseline set of response time information and the later set of response time information indicate a time including a delay between a dns-reply message received by the host from the at least one peer of the host and a tcp_syn/udp message sent from the host in response to the dns-reply message received.

8. The method of claim 1 wherein at least one of the one or more types of transactions involving the host is a transmission control protocol (TCP) transaction.

9. The method of claim 8 wherein each of the baseline set of response time information and the later set of response time information indicate a time including a delay between a tcp-reply message received by the host from the at least one peer of the host and a tcp_syn/udp message sent from the host in response to the tcp-reply message received.

10. The method of claim 1 wherein at least one of the one or more types of transactions involving the host is a post office protocol (POP) transaction.

11. The method of claim 10 wherein each of the baseline set of response time information and the later set of response time information indicate a time including a delay between a reply message received by the host from the at least one peer of the host and a transaction message sent from the host in response to the reply message received.

12. The method of claim 1 wherein at least one of the one or more types of transactions involving the host is a challenge-response transaction.

13. The method of claim 12 wherein each of the baseline set of response time information and the later set of response time information indicate a time including a delay between a challenge message received by the host from the at least one peer of the host and a response message sent from the host in response to the challenge message received.

14. The method of claim 1 wherein at least one of the one or more types of transactions involving the host is a digital signature verification transaction.

15. The method of claim 14 wherein each of the baseline set of response time information and the later set of response time information indicate a time including a delay between a retrieve keys message received by the host from the at least one peer of the host and a reply message sent from the host in response to the retrieve keys message received.

16. The method of claim 1 wherein the act of determining whether or not host slowdown has occurred using the baseline set of response time information and the later set of response time information uses at least one of (A) a feature vector comparison, (B) a statistical test, (C) hypothesis testing, and (D) a heuristic.

17. The method of claim 1 wherein the act of determining whether or not host slowdown has occurred by comparing the baseline set of response time information for at least one of the one or more types of transactions and the later set of response time information for at least one of the one or more types of transactions determines that a host slowdown has occurred if the later set of response time information indicates at least a 10 percent increase in delay in at least one of the one or more types of transactions involving the host from the baseline set of response time information.

18. A computer-implemented method comprising:
   a) determining, by a communications network device that passively monitors one or more network links between A) a host and (B at least one peer of the host, a baseline set of response time information for each of one or more types of transactions, wherein the response time information indicates a time including a delay between the host receiving a particular type of message from the at least one peer of the host and the host responding to the particular type of message, and wherein the monitoring communications network device is (A) a separate and distinct network entity from the host and the at least one peer of the host, and (B) included in or attached to one of a network switch, network router, or a network hub;
   b) determining, by the communications network device, a later set of response time information for each of the one or more types of transactions indicating a time including a delay between the host receiving a particular type of message from at least one peer of the host and the host responding to the particular type of message;
   c) determining, by the communications network device, whether or not one of (A) a hardware modification of the host, (B) a hardware defect of the host, (C) a firmware update of the host, (D) a software update of the host, (E) a firmware problem of the host, or (F) a software problem of the host, has occurred by comparing the baseline set of response time information for at least one of the one or more types of transactions and the later set of response time information for the at least one of the one or more types of transactions; and
   d) controlling the execution of a host change protection policy using at least the determination of whether or not one of (A) a hardware modification of the host, (B) a hardware defect of the host, (C) a firmware update of the host, (D) a software update of the host, (E) a firmware problem of the host, or (F) a software problem of the host has occurred.

19. A communications network device for facilitating host malware detection by passively monitoring one or more network links between (A) a host and (B) at least one peer of the host, the communications network device comprising:
   a) at least one processor;
   b) at least one input device; and
   c) at least one storage device storing a computer executable code which, when executed by the at least one processor, causes the at least one processor to perform a method of
      i) determining a baseline set of response time information for each of one or more types of transactions, wherein the response time information indicates a time including a delay between the host receiving a particular type of message from the at least one peer of the host and the host responding to the particular type of message, and wherein the communications network device is (A) a separate and distinct network entity from the host and the at least one peer of the host, and (B) included in or attached to one of a network switch, a network router, or a network hub;
      ii) determining a later set of response time information for each of the one or more types of transactions indicating a time including a delay between the host receiving a particular type of message from at least one peer of the host and the host responding to the particular type of message;
      iii) determining whether or not host slowdown has occurred by comparing the baseline set of response time information for at least one of the one or more types of transactions and the later set of response time information for the at least one of the one or more types of transactions; and
      iv) controlling the execution of a host malware protection policy using at least the determination of whether or not host slowdown has occurred.

20. The monitoring apparatus of claim 19 wherein determining the baseline set of response time information includes
   1) measuring at least one host response time delay for each of the one or more types of transactions involving the host,
   2) saving each of the at least one host response time delay for each of the one or more types of transactions involving the host,
   3) aggregating the saved at least one host response time delay for each of the one or more types of transactions involving the host,
   4) generating, for the host, a delay characteristic vector using the aggregated at least one host response time delay for the one or more types of transactions involving the host, and
   5) saving the delay characteristic vector.

* * * * *